R. W. BRADLEY.
ELECTRIC SYSTEM FOR OPERATING SPEED VARYING POWER TRANSMISSION.
APPLICATION FILED JAN. 28, 1913.

1,074,599.

Patented Oct. 7, 1913.

WITNESSES:
J. H. Cuno
J. C. Christian

INVENTOR.
R. W. Bradley.
BY
ATTORNEY.

R. W. BRADLEY.
ELECTRIC SYSTEM FOR OPERATING SPEED VARYING POWER TRANSMISSION.
APPLICATION FILED JAN. 28, 1913.

1,074,599.

Patented Oct. 7, 1913.

WITNESSES:

INVENTOR.
R. W. Bradley.
BY
ATTORNEY.

UNITED STATES PATENT OFFICE.

RALPH W. BRADLEY, OF FORT COLLINS, COLORADO.

ELECTRIC SYSTEM FOR OPERATING SPEED-VARYING POWER TRANSMISSION.

1,074,599. Specification of Letters Patent. Patented Oct. 7, 1913.

Application filed January 28, 1913. Serial No. 744,640.

*To all whom it may concern:*

Be it known that I, RALPH W. BRADLEY, a citizen of the United States, residing at Fort Collins, in the county of Larimer and State of Colorado, have invented certain new and useful Improvements in Electric Systems for Operating Speed-Varying Power Transmission, of which the following is a specification.

My invention relates to an electric system for automatically controlling a speed varying power transmission of the type which transmits through the intermediary of an adjustable combination of gears or friction wheels, the uniform rotary movement of an irreversible motor to a driven element at different rates of speed, and its primary object resides in providing a system of electrically operated devices by which the shiftable element of a transmission mechanism of the character described is automatically adjusted in accordance with the resistance or load encountered by the machine to which the system is applied.

While my invention is adapted for use on machines of different character, it is more particularly designed to be employed in connection with the transmission of automobiles or other power driven vehicles whose speed is varied in accordance to different road resistances.

In proceeding in accordance with my invention, I provide a centrifugal governor which is responsive to variations in speed of the driven element and which through the medium of a series of electric circuit breaking devices and a therewith electrically connected electro-magnetic circuit-controlling instrument, regulates the movements of a reversible electric motor which through the medium of suitable transmission means operates the adjustable element of the power transmitting mechanism to which the system is applied, as well as the clutch by which the rotative continuity between the primary motor or engine and the said mechanism, is secured or broken.

Included in the transmission means above referred to is a series of circuit breaking devices by which the circuits in which the motor included in the system is connected, are automatically broken when the movable element of the power transmitting mechanism of the machine to which the system is applied has been adjusted to its proper position for regulating its torque or purchase to compensate for the resistance encountered, the connections between the reversible motor and the clutch above referred to, being adapted to adjust the said clutch so as to break the connection between the primary motor and the transmission mechanism when the shiftable element of the latter is in its neutral position and during the periods that the same is being changed from one speed to another.

In the operation of the system the movable element of the transmission is adjusted from any one speed to another or from its lowest speed to a neutral position, automatically through the instrumentality of the centrifugal governor, but the adjustment of the said element from its neutral position to its low-speed position, or from its neutral position to the reverse, or vice versa, is accomplished manually by means of electric switches which when the system is applied to a motor driven vehicle, are disposed within easy reach of the driver.

Having thus briefly outlined the character and operation of my improved system, I will now proceed to describe the same in detail by reference to the accompanying drawings in the various views of which like parts are similarly designated, and in which.

8, a similar section taken along the line 8—8, Fig. 3, Fig. 9, an elevation of the parts of the mechanism by means of which the movement of the reversible motor included in the system is transmitted to the clutch between the motor of the vehicle and the transmission of the same, the parts having been shown in this view in the position they occupy while the clutch members are interlocked in contradistinction to the position illustrated in Fig. 1 in which the clutch members are disengaged, and Fig. 10, a diagrammatic view of the electrical connections and devices comprised in the system.

In the drawings the reference character A designates the transmission of a motor driven vehicle, which may be of any suitable construction for varying the speed of the propeller shaft in ratio to the relatively constant velocity of the driving shaft to any one of a determinate number of different speeds.

In the construction shown the transmission mechanism is inclosed in a casing 2 and comprises the main gear case shaft 3 which is partially squared as at 4 for transmitting its rotary movement to the sliding transmission element 5 and which at one of its extremities is connected with the propeller shaft 6 by means of a universal joint 7, while at its opposite end, it extends loosely into an axial socket of an enlargement of the driving shaft 8 which, through the medium of a clutch B, connects with the shaft 9 of the primary motor of the vehicle which, for obvious reasons, has not been shown in the drawings. The clutch B is in the form shown, composed of a female friction member 10 secured at the end of the motor shaft and a male friction member 12 which is mounted at the end of the shaft 8 which latter is for the purpose of adjusting the member 12, composed of two longitudinally, slidably connected sections. The transmission further includes a series of four gears of different diameters which are fixedly mounted upon a counter-shaft 13, one of the said gears designated by the numeral 14 being continuously in mesh with an intermediate gear 15 for the reversal of the movement of the propeller shaft with relation to the direction of rotation of the driving shaft 8, while the largest one 16 of the series of gears is continuously in mesh with a gear 17 which is formed upon the end of the driving shaft 8 into which the round extremity of the gear-case shaft 3 loosely extends. The other two gears disposed on the shaft 13 are respectively designated by the numerals 22 and 23 and are proportioned to be engaged by corresponding gears on the shiftable element 5 to turn the propeller shaft at either its lowest or medium rate of speed, with relation to the uniform velocity of the driving shaft. The shiftable element 5 which, as hereinbefore explained, is slidably mounted on the squared portion 4 of the shaft 3, comprises a sleeve which is provided with two gears 18 and 19 and with clutch members 20 adapted to interlock with correlative projections 21 on the gear 17.

By adjustment of the element 5 the clutch members 20 and 21 may be brought in interlocking engagement whereby the movement of the driving shaft 8 is directly imparted to the propeller shaft 6 at an equal rate of speed; by moving the said element so that the gear 19 is in engagement with the gear 23, the movement of the driving shaft is transmitted to the driven shaft at a lower rate of speed; by bringing the gear 18 in mesh with the gear 22 the motion of the driving shaft is converted into a rotation of the propeller shaft at the lowest rate of speed; and by moving the same gear in engagement with the intermediate gear 15 the movement of the propeller shaft is reversed with relation to that of the shaft 8.

In the following description the first mentioned position of the sliding element in which the clutch members are interlocked will, for convenience be called the "high" position, that in which the gears 19 and 23 are in engagement the "intermediate" position, that in which the gears 18 and 22 are in mesh the "low" position, and that in which the gear 18 engages the intermediate gear 15, the "reverse" position, while the position of the sliding element in which its gear 18 is situated between the gears 15 and 22, as shown in the drawings, will be referred to as the "neutral" position.

The elements of the transmission mechanism so far described are *per se*, not part of my invention, their construction is shown merely to convey an understanding as to the general type of power transmitting devices to which my invention is particularly adapted, and I desire it understood that my system for operating the shiftable gears 18 and 19 and the clutch B as will now be described, is equally applicable to transmissions of different character and construction.

My system for operating the transmission comprises, briefly, a reversible motor D which, through the intermediary of a suitable transmission mechanism actuates the sliding element of the transmission A, as well as the clutch B, the said mechanism including a series of circuit breaking devices E which serve to break the circuits in which the motor D is connected after the parts have been adjusted to the desired position by the movement of the latter, as will hereinafter be more fully described.

The letter F designates the centrifugal governor which is responsive to variations in the speed of the propeller shaft 6, G the series of circuit breaking units which are disposed to be successively closed by the action of the governor, and H the electromagnetic reversing device through the medium of which the movements of the reversible motor D are controlled.

The motor D which is preferably mounted upon the gear case 2 is provided at the end of its shaft with a worm 24 which is in operative engagement with a worm gear 25 on a shaft 26 which is rotatably mounted in bearings on brackets 27 that extend laterally from the gear case 2. A pinion 28 on the shaft 26 meshes with a rack 29 which is slidably supported upon a ledge 30 on the side of the gear case and held against lateral displacement by means of straps 31.

The rack is rigidly connected with the sliding element 5 of the transmission A by means of a rod 32 which is attached to the sleeve of the said element by means of a connection 33 and which being longitudinally movably supported in openings in the end walls of the gear case, is connected at one end of the rack 29 with which it is parallel. The shaft 26 is furthermore provided at its ends with oppositely extending crank arms 34 which by means of pitmans 35 are connected respectively with crank arms 36 and 36 which project in one direction from the ends of a rocker shaft 37 which is rotatably mounted in suitably supported bearings 38.

The rocker shaft is by means of a forked arm 39 connected with a trunnioned collar 40 on the sliding section of the driving shaft 8, its function being to alternately move the clutch member 12 at the end of said section, in and out of engagement with its female correlative at the end of the motor shaft 9 during adjustment of the sliding gear element 5 by means of the motor D.

The pitmans 35 are at their extremities at which they connect with the crank arms of the rocker shaft 37, provided with longitudinal slots 41 into which the wrist pins of said crank arms loosely extend, and the parts of the clutch movement are coöperatively arranged so that the movement of the rocker shaft, and in consequence that of the longitudinally movable section of the driving shaft, will be reversed during each movement of the shaft 26 through a quadrant arc, irrespective of its direction.

The units of the series of circuit breakers E are disposed in longitudinal alinement on the ledge 30 of the gear case at distances apart which are in ratio to the spaces through which the sliding element 5 of the transmission must travel from its neutral position shown in the drawings to either the reverse or the low positions or from the low position to the intermediate position, and from the intermediate position to the high position and vice versa.

Each of the circuit breakers consist of a piston composed of two disks 42 and 43 attached at opposite ends of a stem 44, a block 55 of fiber or other nonconductive material which is fitted in a recess in the lower portion of the ledge 30, has in its bottom surface, sockets 45 to receive the lower disks 42 of the pistons and in axial alinement with said sockets, openings in which the stems 44 of the pistons are slidably fitted. The disks 43 at the upper ends of the pistons are movably disposed in openings 47 in the portion of the ledge above its recess and are normally held in engagement with shoulders at the upper ends of said openings by means of springs 46 which are coiled within the latter around the stems of the respective pistons.

Secured on the insulating block 55 in the upper portions of the sockets 45, are sets of contacts 48 which are connected at opposite sides of breaks in the electric circuits controlled by the circuit breaking devices, and which are normally maintained in electrical connection by the engagement of the disks 42 of the respective pistons.

The sockets of the circuit breakers which by their relative position correspond with the neutral, low and intermediate position of the transmission gearing, have two sets of contacts which are connected in the circuits by which the motor D is operated to rotate in opposite directions, and the sockets of the units at the ends of the series E have each, one set of contacts which are connected respectively in the circuits by which the motor is actuated to move the sliding element of the transmission from the neutral to the reverse position or from the intermediate to the high position.

Figures 3, 4, 5, 6:
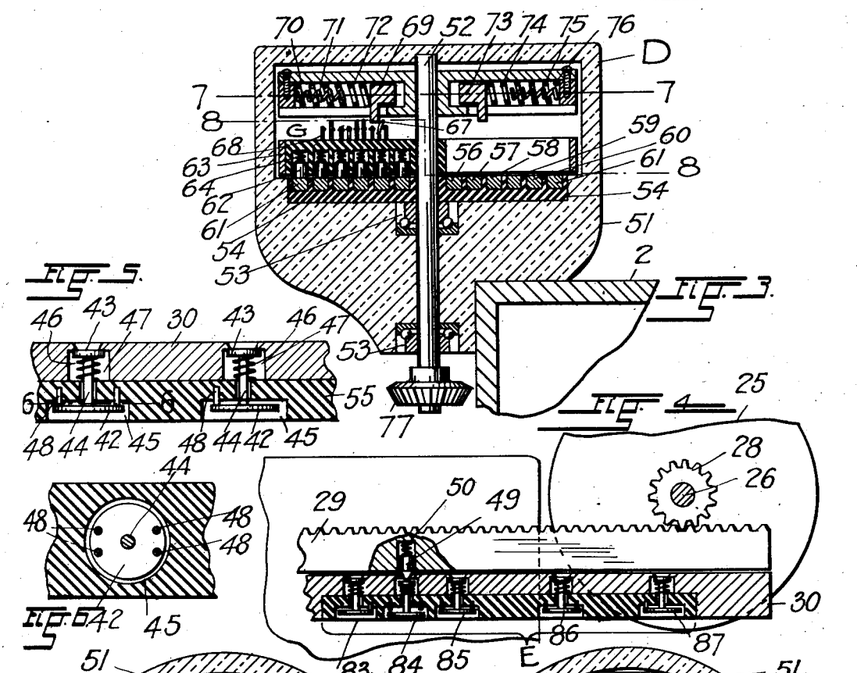
Figures 7, 8:
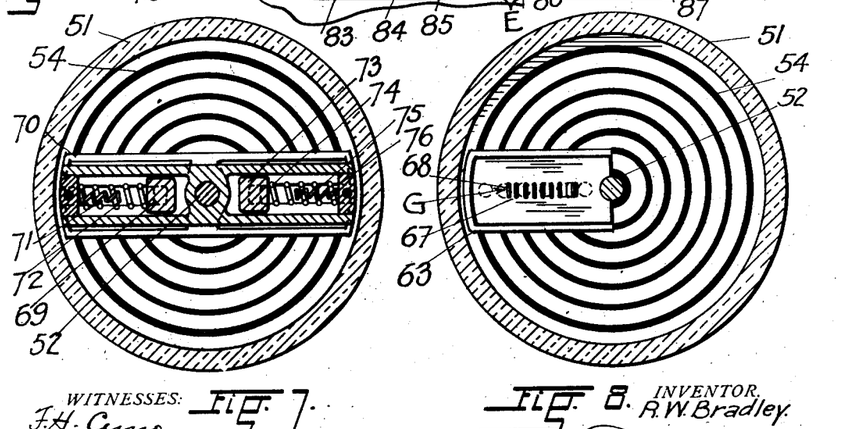

A plunger 49 which is vertically movably fitted in a pocket in the lower surface of the rack 29, has a pointed extremity which when brought in register with one or another of the openings 47 in the ledge 30, enters the same to depress by the action of a spring 50 disposed in the upper portion of the pocket, the respective piston for the purpose of separating its disk 42 from the contacts 48 normally engaged thereby. The governor F which also is mounted on the gear case 2 consists, as shown in Fig. 3, 7 and 8 of the drawings, of a casing 51 in which a vertical shaft 52 is rotatably mounted by means of ball bearings 53. The casing has in a recess of its bottom surface, a block 54 of fiber or other insulating material in which are set six concentric metallic rings 56, 57, 58, 59 60 and 61, the upper surfaces of which are continuously engaged by metallic plungers 62 which are movably fitted in pockets formed in the lower surface of an arm 63 of nonconductive material which is secured in radial relation to the shaft 52.

Coiled springs 64 disposed in the pockets in the arm, serve to insure the continuous conductive engagement of the plungers with the respective rings and the said plungers are, with the exception of that which engages the outer ring 61, separately connected by means of conductors 65 with the members 66 of the circuit breakers comprised in the series G which are mounted upon the arm 63, and whose other members 67 are by means of a conductor 68, connected with the outer ring which is in electric connection with a pole of the source of electricity from which the current required in the operation of the system is derived.

The actuative element of the governor consists of a weight 69 which is slidably disposed in a hollow radial arm 70 secured to the shaft 52 and which during the rotary movement of the latter is, by centrifugal force, driven against the pressure exerted by one or both of a pair of springs 71 and 72 of unequal length and proportionately different strength which are disposed in the outer portions of the hollow arms.

A weight 73 and springs 74 and 75 similar to those above described, are disposed in a hollow arm 76 extending oppositely from the arm 70, to provide a counter-poise for the usual purpose. The shaft of the governor is by means of a pair of intermeshing beveled gears 77 and 78, operatively connected with the main gear case shaft 3 which through the instrumentality of the universal joint 7, is connected with the propeller shaft 6.

Figure 10:
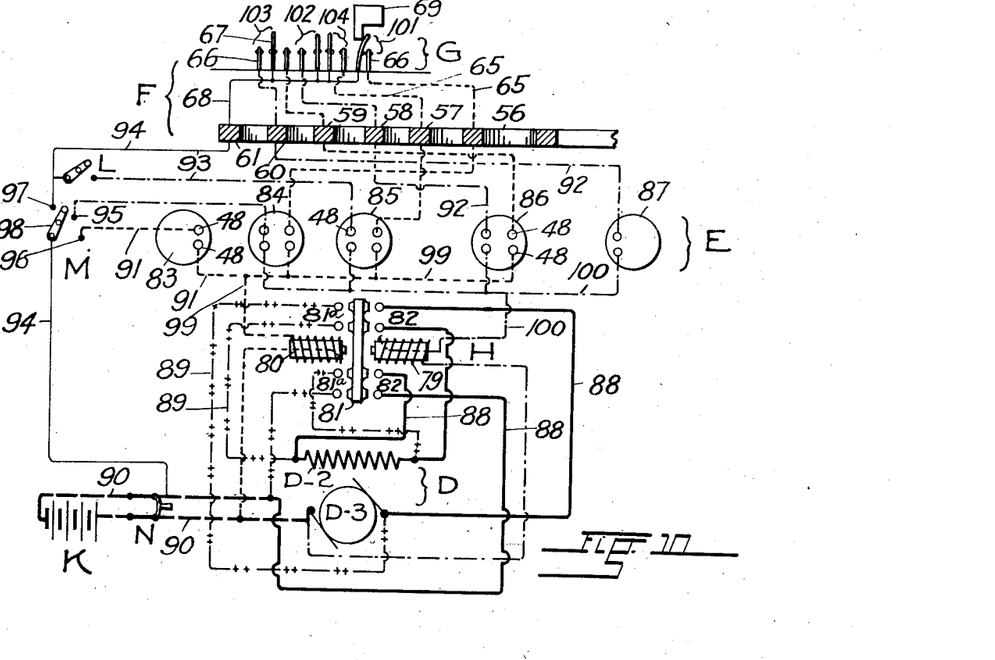

The reversing device H of the system which controls the movements of the reversible motor D has been shown merely in outline in the diagrammatic representation shown in Fig. 10 of the drawings. It may be secured upon the motor casing or any other suitable part of the mechanism and it consists of two oppositely disposed electro-magnetic coils 79 and 80, and a single armature 81 which has a reciprocating movement between the same and which by engagement with four sets of contacts 81ª and 82 disposed in groups of two at opposite sides thereof, alternately open and close the circuits of which said contacts are the terminals.

Having thus described the mechanical construction of the several elements comprised in the system, I will now proceed to explain its operation by reference to the diagrammatic view in which the said elements have been designated in general by the same reference characters used in the preceding description, while the units of the series of circuit breakers E have been designated respectively by the numerals 83, 84, 85, 86 and 87 to facilitate the explanation of the many electrical connections comprised in the system.

The motor D including the armature $D^3$ and the field $D^2$ is of the reversible type, its rotary movement in opposite directions being controlled by the reversing device H which, as hereinbefore explained, is composed of two electro-magnetic coils 79 and 80 and a common reciprocating armature 81 which when moved by the magnetization of one of the coils, closes the circuit which causes a rotary movement of the motor armature in one direction and which when attracted by the other coil closes the circuits which supply the current for rotating the motor in the opposite direction.

Figure 2:
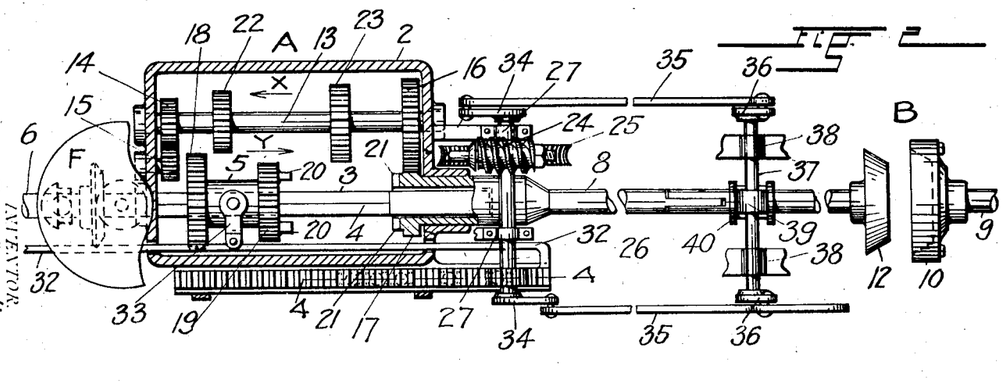

The rotary movements of the motor are by means hereinbefore described, converted into a sliding movement of the element 5 of the transmission A and it will be observed that when the motor armature moves counter-clock-wise, the said element will move in the direction of the arrow Y, Fig. 2 to increase the velocity of the propeller shaft or for terminating its movement in a direction reverse to that of the shaft 8 by disengaging the wheel 18 from the intermediate gear 15, and that when the armature of the motor D rotates in the opposite direction, the sliding element of the transmission is moved in the direction indicated by the arrow X in Fig. 2, to either decrease the speed of the propeller shaft or to reverse its movement with relation to the direction of rotation of the shaft 8 which through the medium of the clutch B, connects with the primary motor of the vehicle.

The circuits which when completed cause the motor armature $D^3$ to rotate clock-wise have been shown in a diagrammatic view in heavy full lines 88 (———) and those by which the said armature is rotated in the opposite direction by dash cross lines 89 (—+—+—+—).

The circuits are connected in multiple by means of conductors 90 with a source of electricity K and the said connections may, if so desired, be discontinued by adjustment of a main switch N. The circuits 88 and 89 are broken in the reversing device H, those for rotating the motor D counter-clock-wise being completed only when the armature 81 is attracted toward the coil 80, while those by which the motor is turned clock-wise are closed when by magnetization of the coil 79, the said armature is moved in the opposite direction.

The operation of the controlling instrument is effected automatically by the engagement of the sliding weight 69 of the governor with the circuit breakers comprised in the series G or manually by the adjustment of a single switch L or a three-point switch M.

The circuit which when closed causes the magnetization of the magnetic coil 80 for rotating the motor D clock-wise has been shown in the drawings by means of broken lines 91 (------), while those which when completed in the governor or by means of the switches L or M, energize the magnetic coil 79 to turn the motor in the opposite direction, are shown in dash-dot lines 92 (—.—.—.).

All the magnet circuits are controlled by the circuit breakers in the series E which normally maintain them in the closed condition and open them only when the sliding element of the transmission moved by the action of the motor D has reached the desired position with relation to the other gears of the same.

In the series of circuit breakers E which are installed on the ledge of the gear case to break the circuits in which they are connected, by the action of the plunger on the rack, the numeral 83 indicates the unit which controls the circuit through which the current flows to actuate the motor D for moving he sliding element of the transmission from the neutral position shown in the drawings to the position for reversing the movement of the propeller shaft in which position the gear 18 of the said element, meshes with the intermediate gear 15.

The circuit breaker 84 controls the circuits which when closed, causes the sliding element to move from either the reverse or the low to the neutral position, the circuit breaker designated by the numeral 85 controls the circuits which when closed, effect a movement of the element 5 from either the neutral or the intermediate to the low speed position, that designated by the numeral 86 controls the circuits for adjusting the transmission from either the low or the high speed positions to the intermediate position, and the circuit breaking unit shown at 87 controls the circuit which when closed, causes a movement of the sliding element from the high speed position in which the clutch member on the gears 19 and 17 are interlocked to the intermediate position in which the gear 19 is in mesh with the gear 23.

One of the contacts 48 of the circuit controlled by the circuit breaker 87 is connected with one of the rings of the governor which in the diagrammatic view is designated by the numeral 60, the contacts at one side of the breaks in the circuits normally completed by the circuit breaking member 86 are connected respectively with the governor rings designated by the numerals 59 and 58, one of the contacts of one of the two sets included in the circuit breaker 85 is connected with the ring 57 of the governor, while one of the contacts of the other set of the same breaker is, by means of a conductor 93, connected with the conductor 94 by means of which the outer ring 61 of the series is connected with the source of electricity K, the flow of current through said conductor being controlled by means of the switch L which, when closed causes the transmission to be adjusted from the neutral to the low position at the initial point in the operation of the machine to which the system is applied.

One of the contacts of one of the pairs included in the circuit breaker 84 is connected with the ring indicated by the numeral 56 and one of the contacts of the other pair of the same circuit breaker, is connected with one of the contacts 95 of the three-point switch N which provides the means for manually controlling the adjustment of the transmission from the neutral position to the reverse, and vice versa. One of the contacts of the single circuit controlled by the unit 83 of the series of circuit breakers E is connected with another point 96 of the three-point switch, the third point 97 and the adjustable member 98 of which are connected at opposite sides of a break in the conductor 94 which as hereinbefore explained, connects the governor with the source of electricity. The other contacts of the circuits which through the intermediary of the reversing device H cause the motor D to rotate counter-clockwise are, by means of conductors 99, connected with the windings of the coil 80, and the other contacts of the sets which are disposed at opposite sides of the breaks in the circuits, which when completed effect a rotary movement of the motor armature in the opposite direction, are connected with the windings of the coil 79 by means of conductors 100.

The circuit breaking units comprised in the series G of the governor are composed of sets of contact blades, all of which are flexible and extend in the path of the sliding weight 69. When the governor is at rest the circuit breaker 101 nearest its axis, is, as shown in Figs. 3 and 10 of the drawings, closed by the engagement of the weight 69, the said unit controlling the circuit which when completed, effects a movement of the sliding element of the transmission from the low position to the neutral position.

To initially start the car to which the system is applied, after the primary motor has been put in motion, the driver closes the switch L which causes the current to flow through the circuit controlled by the circuit breaker 85 of the series E to energize the magnet 79 which by attraction of the armature 81 closes the circuits 88 of the motor and causes the armature of the same to rotate counter clock-wise to impel through the instrumentality of the rack and pinion movement, the driving element of the transmission in the direction of the arrow Y until the gear 18 has been brought in mesh with the low gear 22 when the propeller shaft is rotated at its lowest speed with relation to the uniform velocity of the driving shaft. Simultaneous with the operative engagement of the two gears, the plunger 49 on the rack reaches a position in register with the opening in the ledge 30 which is normally closed by the disk on the piston of the circuit breaker 85, with the result that said piston is moved downwardly and by disengagement of the contacts 48, breaks the circuits of which said contacts are the terminals, and in consequence stops the movement of the motor by deënergization of the magnet coil.

If by increase of speed of the propeller shaft the centrifugal force moves the weight 69 of the governor outwardly it will first of all, open the circuit controlled by the unit 101 and then move the members of the circuit breaker 102 in engagement to move the element 5 of the transmission in a manner identical to that above described, into the intermediate position in which it remains until the speed of the propeller shaft either increases or decreases when in the one instance the sliding weight will engage the flexible contact of the unit designated by the numeral 103, to move the element 5 in the position in which the clutch members 20 and 21 interlock, or when in the other instance, the weight will by the decrease in the speed of the governor shaft, move inwardly and bring the contacts of the unit 105 in engagement to move the element 5 from the high position to the intermediate position or bring the contacts of the unit 104 in engagement to move the said element from the intermediate position to the low position, which movements are accomplished by energization of the magnet coil 80 which causes the armature 81 to close the circuits which control the clock-wise movement of the armature of the motor D. It will thus be understood that in the manner described the transmission will be automatically adjusted through the instrumentality of the governor to vary the speed of the propeller shaft in response to the resistance encountered and that when the sliding element of the transmission is in the neutral position it may be brought to the low position by adjustment of the switch L by the driver of the machine.

To reverse the direction of rotation of the propeller shaft with relation to that of the motor shaft, the member 98 of the three-point switch is moved in engagement with the point 96 which breaks the circuit of the governor and closes that which is controlled by the unit 83 of the series E on the ledge 30, until the plunger on the rack breaks the said circuit by depression of the piston of the last mentioned unit when the gear 19 of the element has reached the position in which it meshes with the intermediate gear 15. To return the sliding element of the transmission to the neutral position, the member 98 of the three point switch is moved in engagement with the point 95 to close the circuit controlled by the unit 84 of the series E and connected with the magnet coil 79 of the reversing device H.

Figure 1:
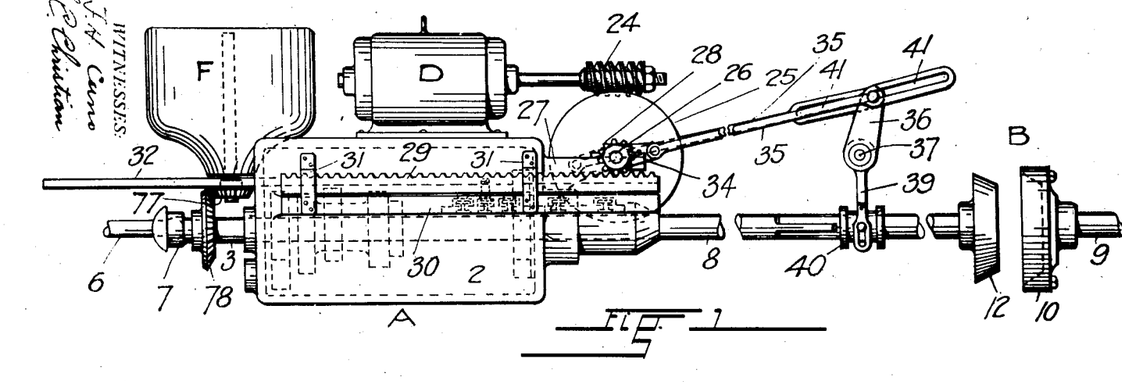
Figure 1 represents a side elevation of the mechanical devices comprised in the system, in connection with the transmission and the therewith associated parts of the driving mechanism of a motor driven vehicle, Fig. 2, a plan view of the association of devices shown in Fig. 1, with the casing of the transmission shown in section to reveal the gearing inclosed thereby, Fig. 3, an enlarged sectional view of the centrifugal governor used in the system, Fig. 4, a fragmentary enlarged section taken along the line 4—4, Fig. 2, showing the circuit breaking devices included in the means whereby the movement of the motor of the system is transmitted to the shiftable element of the power transmission mechanism, Fig. 5, a fragmentary sectional view of the lower member of the parts of the said transmission means, shown in Fig. 3, drawn to an enlarged scale to better illustrate the construction of the said circuit breaking devices, Fig. 6, a section taken along the line 6—6, Fig. 5, Fig. 7, a transverse section through the governor taken along the line 7—7, Fig. 3, Fig.
Figure 9:
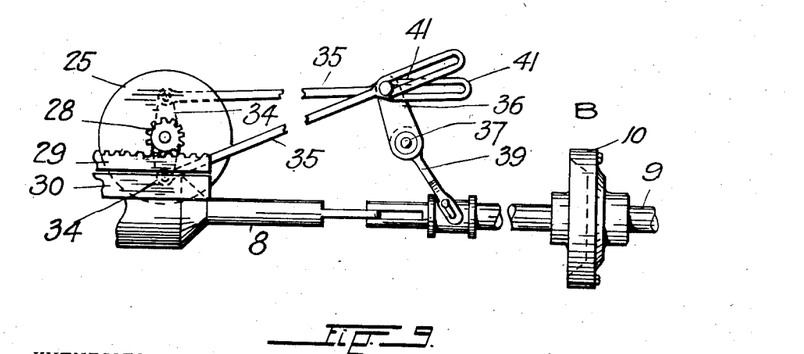

When the sliding element is in the positions in which the movement of the shaft 8 is transmitted to the propeller shaft through the intermediary of the transmission, the members of the clutch B are in frictional engagement to effect the rotative continuity between the first mentioned shaft and the motor of the vehicle, as is shown in Fig. 9 of the drawings, but when the sliding element is in the neutral position or while it is being impelled from one operative position to another the movement of the crank arms 34 on the shaft 36, is through the medium of the pitmen 35 converted into a movement of the rocker shaft 37, by which the male member of the said clutch is disengaged from the female member at the end of the motor shaft 9, as is illustrated in Figs. 1 and 2.

While I have shown and described the mechanical devices included in my system in the simplest and best form at present known to me, I do not desire to be limited to the particular form shown, since in the broadest aspect of my invention the said devices may be made of different construction without departing from the principle or sacrificing any of the advantages of this invention. It will also be understood that the system of electrical connections may be varied from that shown and described except to the extent indicated in the following claims.

What I claim and desire to secure by Letters-Patent is:

1. In a system of the class described, a driving element, a driven element, an adjustable transmission mechanism adapted to transmit the movement of the said driving element to the driven element at different rates of speed, an electric motor for the adjustment of said mechanism, a normally open circuit therefor, a series of circuit-breakers adapted to separately close said circuit when electrically connected, a device responsive to variations in the movement of the driven element, adapted to successively actuate the said circuit-breakers, and means coöperative with the transmission mechanism for opening said circuit at determinate points in the adjustment of the said mechanism.

2. In a system of the class described, a driving element, a driven element, an adjustable transmission mechanism adapted to transmit the movement of the said driving element to the driven element at different rates of speed, an electric motor for the adjustment of said mechanism, a normally open circuit therefor, a governor including a rotary member connected to be driven by the movement of said driven element, a movable device carried by said member and a series of circuit breakers adapted to separately close said circuit when electrically connected, and disposed to be successively actuated by the said device when impelled by centrifugal force, and means coöperative with the transmission mechanism for opening said circuit at determinate points in the adjustment of the said mechanism.

3. In a system of the class described, a driving element, a driven element, a mechanism for transmitting the movement of the said driving element to the driven element at different rates of speed, including an adjustable part, a motor for adjusting said part, a normally open circuit therefor, a series of circuit breakers adapted to separately close the said circuit, when electrically connected, a device responsive to variations in the movement of the driven element, adapted to successively actuate the said circuit-breakers, a series of circuit breakers electrically connected to separately open the said circuit, and means coöperative with the adjustable part of said mechanism for actuating the circuit breakers in the last mentioned series separately at determinate points in its movement.

4. In a system of the class described, a driving element, a driven element, a mechanism for transmitting the movement of the said driving element to the driven element at different rates of speed, including an adjustable part, a motor, a normally open circuit therefor, mechanism for transmitting the movement of said motor to the said part, including a reciprocatory-member, a series of circuit breakers adapted to separately close the said circuit when electrically connected, a device responsive to variations in the movement of the driven element, adapted to successively actuate said circuit-breakers, a series of circuit-breakers connected to separately open said circuit, and means on said reciprocatory member adapted to separately actuate the circuit breakers of the last mentioned series, to open the circuit at determinate points in the movement of the adjustable part of the transmission mechanism.

5. In a system of the class described, a driving element, a driven element, a mechanism for transmitting the movement of the said driving element to the driven element at different rates of speed, including an adjustable part, a clutch adapted to discontinue the operative connection between said driving element and said mechanism, a motor, a normally open circuit therefor, means adapted to convert the movement of said motor into an operative movement of said part and to simultaneously effect an adjustment of said clutch to discontinue the connection between the driving element and the said transmission mechanism during the periods of inaction of the latter, a series of circuit breakers adapted to separately close the said circuit when electrically connected, a device responsive to variations in the movement of the driven element, adapted to successively actuate the said circuit-breakers, and means coöperative with the adjustable part of the transmission mechanism for opening said circuit at determinate points in the movement of the said part.

6. In a system of the class described, a driving element, a driven element, a mechanism for transmitting the movement of the said driving element to the driven element at different rates of speed, including an adjustable part, a clutch adapted to discontinue the operative connection between said driving element and said mechanism, a motor, a normally open electric circuit therefor, a rotary shaft in operative connection with said motor and having oppositely extending crank arms, means for transmitting a movement of said shaft to the said adjustable part, a rocker-shaft in operative connection with said clutch and having crank arms extending in one direction, pitmen pivotally connected with the crank arms on the first mentioned shaft and having longitudinal slots in which the wrists of the crank arms of the rocker-shaft loosely extend, a series of circuit-breakers adapted to separately close the said circuit when electrically connected, a device responsive to variations in the movement of the driven element, adapted to successively actuate the said circuit-breakers, and means coöperative with the adjustable part of the transmission mechanism for opening said circuit at determinate points in the movement of the said part.

7. In a system of the class described, a driving element, a driven element, a mechanism for transmitting the movement of the said driving element to the driven element, including a part adapted to be adjusted from a neutral position to any one of a number of positions for varying the speed of the driven element relative to that of the driving element, a motor for adjusting said part, a normally open circuit therefor, a series of circuit breakers adapted to separately close the said circuit when electrically connected, a device responsive to variations in the movement of the driven element, adapted to successively actuate said circuit breakers, manually operated means for moving said part from its neutral position to its position by which the movement of the driving element is transmitted to the driven element at the lowest speed, and means coöperative with the adjustable part of the transmission mechanism for opening said circuit at determinate points in the movement of the said part.

8. In a system of the class described, a driving element, a driven element, a mechanism for transmitting the movement of the said driving element to the driven element, including a part adapted to be adjusted from a neutral position to any one of a number of positions for varying the speed of the driven element relative to that of the driving element, a motor for adjusting said part, a normally open circuit therefor, a series of circuit breakers adapted to separately close the said circuit when electrically connected, a device responsive to variations in the movement of the driven element, adapted to successively actuate said circuit-breakers, manually operated electrical connections for closing the said motor-circuit to move the said part from its neutral position to its position by which the movement of the driving element is transmitted to the driven element at the lowest speed, and means coöperative with the adjustable part of the transmission mechanism for opening said circuit at determinate points in the movement of the said part.

9. In a system of the class described, a driving element, a driven element, a mechanism for transmitting the movement of the said driving element to the driven element including a part adapted to be adjusted from a neutral position to any one of a number of positions for varying the speed of the driven element relative to that of the driving element or to a position for reversing the movement of the driven element relative to that of the driving element, a motor for adjusting said part, a normally open circuit therefor, a series of circuit breakers adapted to separately close the said circuit when electrically connected, a device responsive to variations in the movement of the driven element, adapted to successively actuate said circuit-breakers, manually operated means for moving said part from its neutral position to its position by which the movement of the driving element is transmitted to the driven element at the lowest speed, and for moving said part from its neutral position to its position by which the movement of the driven element is reversed, and vice versa, and means coöperative with the adjustable part of the transmission mechanism for opening said circuit at determinate points in the movement of the said part.

10. In a system of the class described, a driving element, a driven element, a mechanism for transmitting the movement of the said driving element to the driven element, including a part adapted to be adjusted from a neutral position to any one of a number of positions for varying the speed of the driven element relative to that of the driving element or to a position for reversing the movement of the driven element relative to that of the driving element, a motor for adjusting said part, a normally open circuit therefor, a series of circuit breakers adapted to separately close the said circuit when electrically connected, a device responsive to variations in the movement of the driven element, adapted to successively actuate said circuit-breakers, manually operated electrical connections for closing the said motor circuit for moving said part from its neutral position to its position by which the movement of the driving element is transmitted to the driven element at the lowest speed and for moving said part from its neutral position to its position by which the movement of the driven element is reversed, and vice versa, and means coöperative with the adjustable part of the transmission mechanism for opening said circuit at determinate points in the movement of the said part.

11. In a system of the class described, a driving element, a driven element, an adjustable transmission mechanism adapted to transmit the movement of said driving element to the driven element at different rates of speed, a reversible motor, for adjusting said mechanism, normally open electric circuits therefor, an electrically operated switch for closing said circuits to rotate said motor in either direction, and means responsive to variations in the movement of said driven element for operating said switch, when the movement of said driven element changes to any one of a number of predetermined speeds.

12. In a system of the class described, a driving element, a driven element, an adjustable transmission mechanism adapted to transmit the movement of said driving element to the driven element at different rates of speed, a reversible motor for adjusting said mechanism, normally open circuits therefor, an electrically operated switch for closing said circuits to rotate said motor in either direction, a series of circuit breakers adapted to separately close the normally open circuits in which said switch is connected, a device responsive to variations in the movement of the driven element to successively actuate said circuit-breakers, and means coöperative with the transmission mechanism for opening the said circuits of the instrument at determinate points in the adjustment of said mechanism.

13. In a system of the class described, a driving element, a driven element, an adjustable transmission mechanism adapted to transmit the movement of said driving element to the driven element at different rates of speed, a reversible motor for adjusting said mechanism, normally open circuits therefor, an electrically operated switch for closing said circuits to rotate said motor in either direction, a series of circuit breakers adapted to separately close the normally open circuits in which said instrument is connected, a device responsive to variations in the movement of the driven element to successively actuate said circuit-breakers, a series of circuit breakers electrically connected to separately open the said circuits of the switch, and means coöperative with the transmission mechanism for actuating the circuit breakers comprised in the last mentioned series, separately at determinate points in the adjustment of said mechanism.

14. In a system of the class described, a driving element, a driven element, an adjustable transmission mechanism adapted to transmit the movement of said driving element to the driven element at different rates of speed, a reversible motor for adjusting said mechanism, normally open circuits therefor, an electrically operated switch for closing said circuits to rotate said motor in either direction, comprising two electro-magnetic coils, an armature adapted to be moved by energization of either coil and circuit breakers adapted to close the motor circuits and adapted to be closed by the movements of said armature, a series of circuit breakers electrically connected to separately energize either magnet, a device responsive to variations in the movement of said driven element to successively actuate said circuit breakers, and means coöperative with the transmission mechanism for deënergizing said magnets at determinate points in the adjustment of said mechanism.

15. In a system of the class described, a driving element, a driven element, an adjustable transmission mechanism adapted to transmit the movement of said driving element to the driven element at different rates of speed, a reversible motor for adjusting said mechanism, normally open circuits therefor, an electrically operated switch for closing said circuits to rotate the motor in either direction, comprising two electro-magnetic coils, normally open circuits therefor, an armature adapted to be moved by energization of either coil, and circuit breakers adapted to close the motor circuits and adapted to be closed by the movements of said armature, a series of circuit breakers electrically connected to separately close the circuit of either magnet, a device responsive to variations in the movement of said driven element to successively actuate said circuit breakers, a series of circuit breakers electrically connected to separately open the magnet circuits, and means coöperative with the transmission mechanism for actuating the circuit breakers of the last mentioned series separately at determinate points in the adjustment of the said mechanism.

16. In a system of the class described, a driving element, a driven element, a mechanism for transmitting the movement of the said driving element to the driven element, including a part adapted to be adjusted from a neutral position to any one of a number of positions for varying the speed of the driven element relative to that of the driving element, a reversible motor for adjusting said part, normally open circuits therefor, an electrically operated switch for closing the motor circuits to rotate the motor in either direction, normally open circuits for said switch, a series of circuit breakers adapted to separately close either circuit of said switch, manually operated electrical connections for closing one of the motor circuits to move the said part from its neutral position to its position by which the movement of the driving element is transmitted to the driven element at the lowest speed, and means coöperative with said adjustable part of the transmission mechanism for opening the circuits of the switch at determinate points in the movement of the said part.

17. In a system of the class described, a driving element, a driven element, a mechanism for transmitting the movement of the said driving element to the driven element, including a part adapted to be adjusted from a neutral position to any one of a number of positions for varying the speed of the driven element relative to that of the driving element or to a position for reversing the movement of the driven element relative to that of the driving element, a reversible motor for adjusting said part, normally open circuits therefor, an electrically operated switch for closing the motor circuits to rotate the motor in either direction, normally open circuits for said switch, a series of circuit breakers adapted to separately close either circuit of said switch, manually operated electrical connections for closing one of the motor circuits to move the said part from its neutral position to its position by which the movement of the driving element is transmitted to the driven element at the lowest speed, manually operated electrical connections for closing the motor circuits for moving said part from its neutral position to its position by which the movement of the driven element is reversed, and vice versa, and means coöperative with said adjustable part of the transmission mechanism for opening the circuits of the switch at determinate points in the movement of the said part.

18. In a system of the class described, a driving element, a driven element, a mechanism for transmitting the movement of said driving element to the driven element at different rates of speed, a clutch adapted to discontinue the operative connection between said driving element and said mechanism, a reversible motor, normally open circuits therefor, an electrically operated switch for closing either of the motor-circuits to rotate the motor in opposite directions, normally open circuits for said switch, means adapted to convert the movements of the motor into an adjustment of said mechanism and to simultaneously effect an adjustment of the clutch to discontinue the connection between the driving element and the transmission mechanism during the periods that the latter is inactive, a series of circuit-breakers adapted to separately close either circuit of said switch, a device responsive to variations in the movement of the driven element to successively actuate said circuit-breakers, and means coöperative with the transmission mechanism for opening the circuits of said switch at determinate points in the adjustment of said mechanism.

19. In a system of the class described, a driving element, a driven element, a mechanism for transmitting the movement of said driving element to the driven element at different rates of speed, a clutch adapted to discontinue the operative connection between said driving element and said mechanism, a reversible motor, normally open circuits therefor, an electrically operated switch for closing either of the motor-circuits to rotate the motor in opposite directions, normally open circuits for said switch, means adapted to convert the movements of the motor into an adjustment of said mechanism and to simultaneously effect an adjustment of the clutch to discontinue the connection between the driving element and the transmission mechanism during the periods that the latter is inactive, a series of circuit breakers adapted to separately close either circuit of said switch, a device responsive to variations in the movement of the driven element to successively actuate said circuit breakers, a series of circuit-breakers electrically connected to separately open the circuits of said switch, and means coöperative with the transmission mechanism for actuating the circuit breakers comprised in the last mentioned series at determinate points in the movement of said mechanism.

In testimony whereof I have affixed my signature in presence of two witnesses.

RALPH W. BRADLEY.

Witnesses:
  B. A. GOODING,
  S. M. GIBBS.